United States Patent [19]

Dininio

[11] 4,082,108
[45] Apr. 4, 1978

[54] VALVE BLOCK

[75] Inventor: Thomas Dininio, Milville, N.J.

[73] Assignee: Maul Technology Corporation, Indianapolis, Ind.

[21] Appl. No.: 706,647

[22] Filed: Jul. 19, 1976

[51] Int. Cl.² ................................. F16K 11/10
[52] U.S. Cl. .................. 137/269.5; 65/173; 91/443; 137/271; 137/454.5; 137/596.16; 137/884
[58] Field of Search ............... 91/443; 137/269, 269.5, 137/271, 454.5, 454.6, 596.1, 596.2, 608; 65/172, 173, DIG. 13

[56] References Cited
U.S. PATENT DOCUMENTS

| | | | |
|---|---|---|---|
| 2,922,432 | 1/1960 | Huntington | 137/269.5 |
| 3,244,193 | 4/1966 | Loveless | 137/454.6 |
| 3,589,387 | 6/1971 | Raymond | 137/271 |
| 3,918,489 | 11/1975 | Foster | 137/608 X |

Primary Examiner—Robert G. Nilson
Attorney, Agent, or Firm—Seidel, Gonda & Goldhammer

[57] ABSTRACT

A valve block assembly for use in glassware forming machines is disclosed. The valve block has at least two rows of valve stations arranged parallel to one another. An air supply manifold and an air exhaust manifold communicates with each row of valve stations. A cartridge valve is disposed at each of the valve stations for controlling the air flow through a respective valve station. An outlet conduit, having a needle valve disposed within it, forms a flow path away from the cartridge valve. A check valve is also disposed within at least one of said outlet conduits. All of the valves are mounted in a vertical front face of the valve block.

18 Claims, 5 Drawing Figures

VALVE BLOCK

BACKGROUND OF THE INVENTION

The invention relates to a valve block for use with an I.S. machine for forming hollow glass articles. This type of machine forms the glass articles by first press or blow molding a gob of molten glass into a parison or blank of molten glass. The formed blank or parison is then transferred to a blow mold wherein it is subjected to a blowing process for forming the hollow glass article into its final shape.

The various functions of the forming machine are all pneumatically actuated. Some of the functions to be performed include: actuating a plunger during the press and blow operation, actuating cylinders for controlling mold and blank arms, inverting the parison, moving the funnel, baffle and scoop, etc. A valve block is interposed between a source of pressurized air and the forming machine. The valve block performs the function of supplying pressurized air to the various stages of the forming machine in a properly timed sequence. A prior art valve block is disclosed in U.S. Pat. No. 3,918,489.

The valve block itself has a plurality of valve stations which each in turn supplies air for a specific function of the forming machine. Each of the valve stations is connected to a source of pressurized air. Each of the valve stations has a cartridge or supply valve which has a valve member biased to a closed position in order to block communication from the source of air until its associated function is to be performed. When a valve's associated function is to be performed, the valve member is moved to a position which permits the pressurized air to flow through the valve station into the forming machine. The timing of the actuation of such supply valves can be accomplished either mechanically or electronically. In the preferred embodiment of the present invention, supply valves are electronically controlled.

A major drawback of the valve blocks of the prior art is the difficulty of the maintenance of the valves within the block. In order to change or service a valve within a prior art block, a major portion of the valve block assembly has to be removed. Such an operation takes approximately one hour. Another drawback of the prior art valve blocks is the excessive noise generated by such blocks.

A further disadvantage of the prior art valve blocks is the limited speed with which the blocks could supply air to a forming machine. The speed with which the functions of the forming machine could be performed was thereby also limited. Prior art devices attempted to overcome this limitation by supplying the air at higher pressures. This solution proved unsatisfactory in that it led to excessive and quick wear upon the valve blocks and machine.

SUMMARY OF THE INVENTION

A valve block assembly for use in a glassware forming machine is disclosed. The valve block has at least two rows of valve stations arranged parallel to one another and an air supply manifold and an air exhaust manifold in communication with each row. A cartridge valve is disposed within each valve station to control the air flow through a respective station. An outlet conduit having a needle valve disposed within it forms a flow path away from the cartridge valve. A check valve is disposed within at least one of said outlet conduits.

All of the valves within the block are retained by means removable directly from the front vertical face of the valve block. The cartridge valves are each secured by a separate retainer, which threads into the front face of the valve block. Each needle valve threads directly into the front vertical face of the valve block. The check valves are secured within the valve block by retainers, which are removable from the front vertical face of the valve block. The check valve retainers of each row of valve stations are held within the valve block by a hold down bar.

The servicing of the valves of the instant invention is much simpler than the servicing of any of the prior art valve blocks. Any valve of the present valve block can be removed in a matter of a few minutes versus the one hour required to remove certain valves from a prior art valve block.

The valve block operates at a much quieter level than any of the prior art valve blocks. The valve block of the present invention meets all present OSHA noise level safety standards. This noise level reduction is accomplished by connecting the captured exhaust to an exhaust manifold and muffler.

The valve block of the present invention can supply air to the forming machine at a higher speed than prior art valve blocks without the necessity of increasing the pressure of the air source. This is accomplished by providing a check valve with a flow passage having an effective diameter substantially equal to the diameter of the conduits in communication with the check valve. Thus, a bottle forming machine can be operated at a high speed without the machine and/or valve block being subjected to excessive wear and frequent breakdowns.

Accordingly, it is an object of the invention to provide an improved valve block for a glass forming machine.

Another object of the invention is to provide a valve block for a glass forming machine which is readily serviceable.

A further object of the invention is to provide a valve block wherein all valves are readily accessible from the front face of the valve block.

It is still a further object of the invention to provide a valve block for glass forming machines having a low noise level which complies with all current OSHA standards.

A further object of the invention is to provide a valve block which can supply air to the forming machine at high speeds without causing excessive wear to the valve block.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
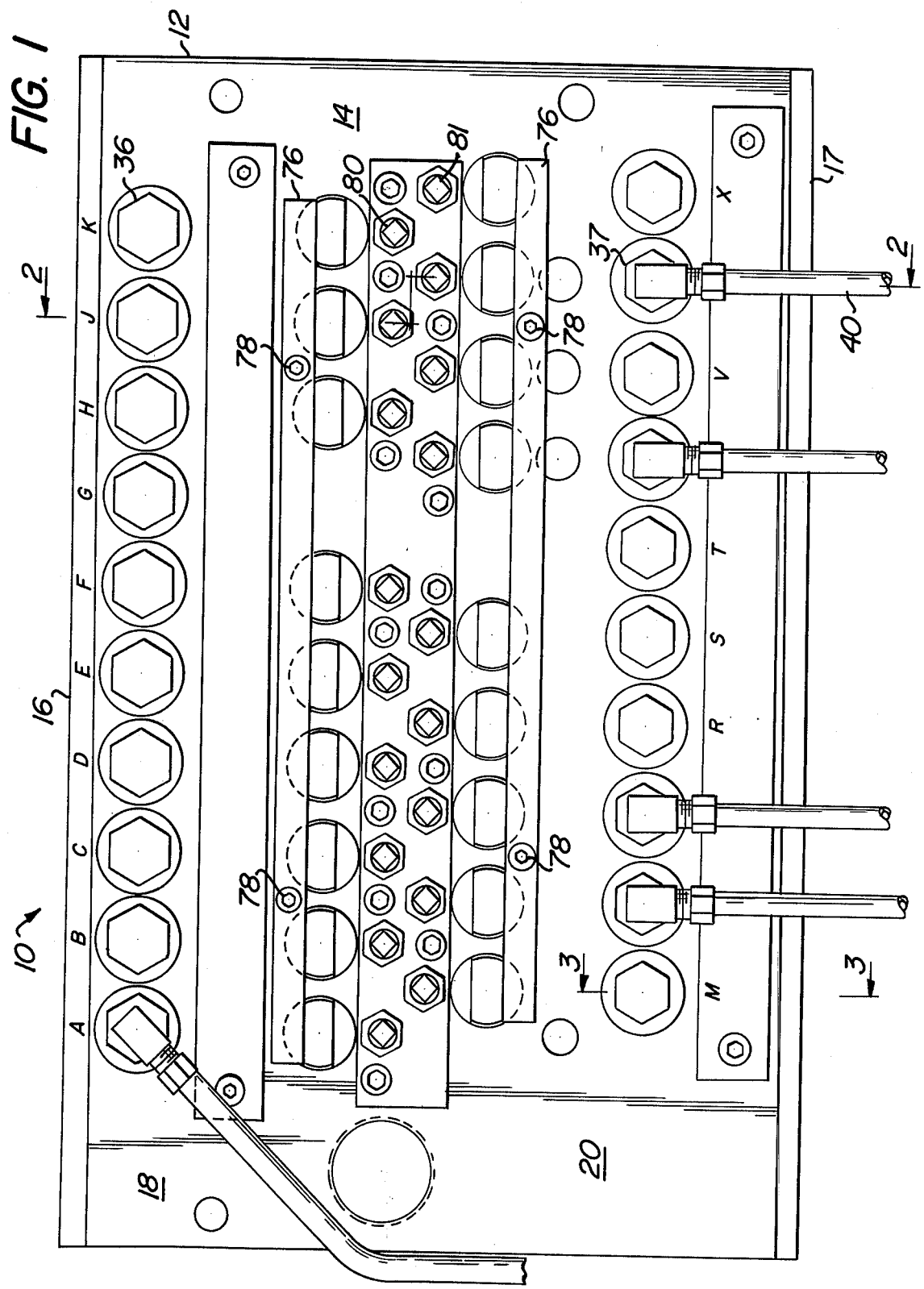
FIG. 1 is an elevational view of the front face of the valve block.

Referring to the drawings in detail, wherein like numerals indicate like elements, there is shown in FIG. 1 a valve block assembly of the present invention generally designated as 10. The assembly 10 is comprised of a block 12 having a front face 14. A plurality of upper valve stations 16 and lower valve stations 17 extend into the block 12. The valve stations 16, 17 are arranged respectively in an upper row 18 and a lower row 20.

An air supply manifold 22 communicates with the valve station 16 of upper row 18, while a separate air supply manifold 24 communicates with the valve stations 17 of lower row 20. Similarly, an exhaust manifold 26 communicates with the valve stations 16 of upper row 18, while exhaust manifold 28 communicates with the valve stations 17 of lower row 20. The air from the air supply manifolds 22, 24 is supplied at a suitable predetermined pressure, typically 32 psi.

A cartridge valve 29 is disposed at each valve station 16, while a similar cartridge valve 30 is disposed at each valve station 17. The cartridge valves control the flow of air through a respective valve station 16, 17. The cartridge valves 29, 30 have movable valve members 31, 32. The valve members 31, 32 are spring biased to a closed position whereby air cannot flow from the air supply manifolds 22, 24 into the interior of the valve stations 16, 17. This bias is overcome by means of pressurized air entering through the pilot inlets 33, 34. The pressurized air is introduced through pilot inlets 33, 34 whenever the function within the forming machine operated by the respective valve station is to be performed.

Solenoid valves are used to control the flow of air from pilot inlets 33, 34. The timing of the actuation of the solenoid valves is accomplished by any conventional electronic timing mechanism. The solenoid valves can also be actuated by an individual toggle switch associated with each valve station. As a safety mechanism, the toggle switches will not activate the solenoid valves whenever the timing mechanism is in operation. The use of solenoid valves and electronic timing mechanisms is conventional and well known in the art.

Figure 2:
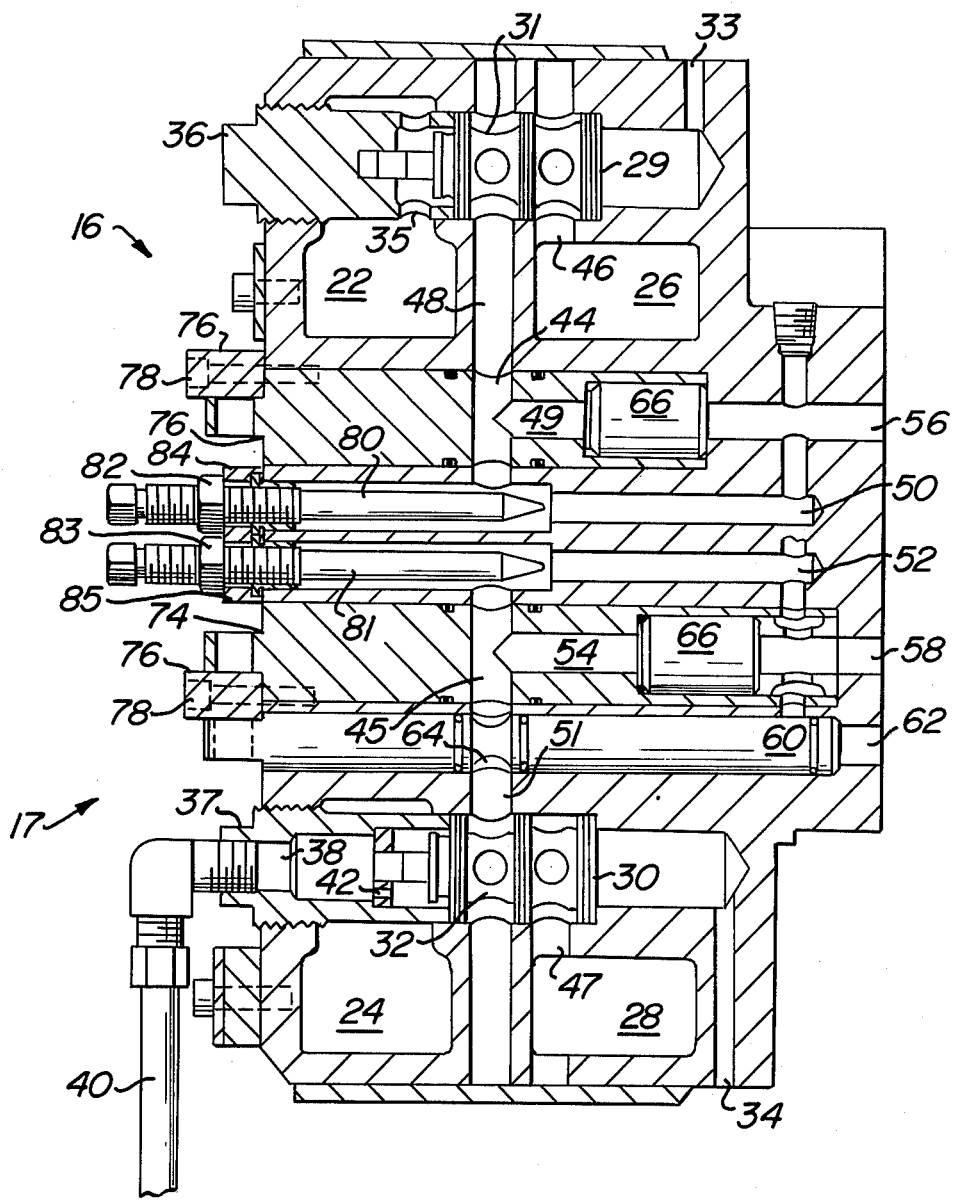
FIG. 2 is a sectional view taken along line 2—2 of FIG. 1.

In the valve station 16 shown in the upper portion of FIG. 2, pressurized air for actuating a portion of the forming machine is supplied to the cartridge valve 29 from the manifold 22 by way of aperture 35. Each cartridge valve 29 is held in position within the valve block 12 by means of a discrete retainer 36. Each retainer 36 is threaded directly into the block 12. In the valve station 17 shown in the lower portion of FIG. 2, pressurized air is not supplied from the manifold 24 but rather is supplied from an isolated source. The pressurized air is supplied by way of an air inlet 38 within the cartridge valve retainer 37 which in turn communicates with a source of pressurized air through tubing 40. The pressurized air can thereafter pass through aperture 42 to cartridge valve 30.

The source of isolated air is used whenever the pressure of the air from the supply manifolds 22, 24 is not suitable for the respective function being actuated by a particular valve station. For certain functions, such as settle blow or the plunger upstroke during the press operation, air pressure below the typical manifold pressure of 32 psi is needed. Air pressure as low as 11 psi may be necessary. For other functions, such as closing the blank or the mold, air pressure higher than the typical manifold pressure of 32 psi may be required. In such situations, a valve retainer 37 as shown in the lower portion of FIG. 2 would be used and the tubing 40 would be connected to a source of pressurized air of the required pressure.

When a specific valve station is required to supply air to the forming machine, air is supplied through pilot inlet 33 or 34 and moves the valve member 31 or 32 to a position to allow fluid communication through the valve station. In a valve station 16, arranged as shown in the upper portion of FIG. 1, the pressurized air from the manifold 22 will flow through the aperture 35 and thereafter through the valve 29 into outlet conduit 44. In a valve station 17, arranged as shown in the lower portion of FIG. 2, the pressurized air will pass from inlet 38 through the aperture 42 and thereafter through cartridge valve 30 to outlet conduit 45. Upon completion of the required function within the forming machine, the air supply from the pilot inlet 33 or 34 is stopped and the valve member 31 or 32 returns to its closed position. While a valve member 31 or 32 is returning to its blocking position, communication between an exhaust manifold 26 or 28 and an outlet conduit 44 or 45 is permitted by way of aperture 46 or 47.

The upper outlet conduit 44 includes a primary conduit 48 and branch conduits 49 and 50. The lower outlet conduit 45 includes a primary conduit 51 and branch conduits 52 and 54. The upper branch conduits 49 and 50 both communicate with an outlet 56, while the lower branch conduits 52 and 54 communicate with an outlet 58. The outlets 56 and 58 communicate with various sections of the forming machine.

The valve station 17 shown in the lower portion of FIG. 2 is arranged to supply air to the plungers in a press and blow process of the forming machine. An insert plug 60 is provided to block any air flow through outlet 62. The plug 60 allows communication along primary conduit 51 by way of recess 64. Air can thereby by supplied to outlet 58 by way of branch conduits 52, 54.

Check valves 66 are disposed within branch conduits 49 and 54. The flow path through the check valves 66 has substantially the same effective diameter as that of the primary conduits 48, 51 and the branch conduits 49, 54. By providing such substantially uniform flow path diameter, air can be supplied to the forming machine at speeds higher than is possible with prior art valve blocks without increasing the pressure of the air supply.

Figure 4:
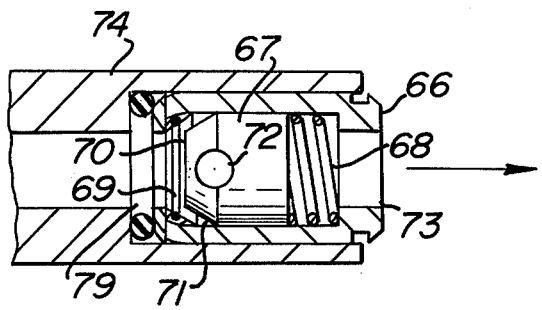
FIG. 4 is a sectional view of a check valve arranged to allow flow from the left to the right.
Figure 5:
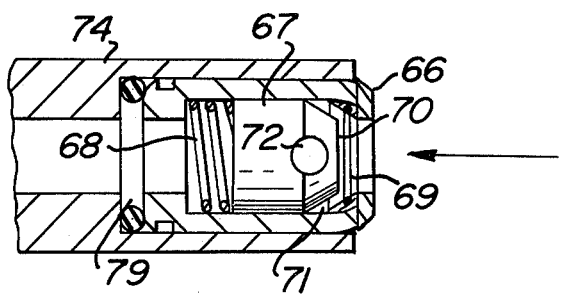
FIG. 5 is a sectional view of a check valve arranged to allow flow from the right to the left.

The flow path through check valves 66 is best seen in FIGS. 4 and 5. Since the check valves 66 are all of similar construction, only one such valve will be hereinafter described. The check valve 66 has a valve member 67 which is biased by a spring 68 to seat on O-ring 69. The spring 68 biases the valve member 67 to a closed position on O-ring 69 until sufficient pressure is exerted on the front face 70 of the valve member 67 to overcome such bias. When sufficient pressure is exerted, the valve member 67 moves away from the O-ring 69 and air will flow through the check valve 66. The air will flow into the annular area 71, through a plurality of holes 72 within the valve member 67, into the interior of the valve member 67 and out of the exit aperture 73. The valve member preferably has four holes 72. The flow path through the annular area 71 and holes 72 has an effective diameter substantially equal to the diameter of the primary conduits 48, 51 and the branch conduits 49, 54. The flow paths through the interior of the valve member 67 and through exit aperture 73 also have effective diameters substantially equal to that of the primary conduits 48, 51 and the branch conduits 49, 54.

Also as best seen in FIGS. 4 and 5, the check valves 66 are reversible. In FIG. 4, the check valve is arranged to allow flow from the left to the right while blocking any flow in the opposite direction. In FIG. 5, the check valve 66 is arranged to allow flow from the right to the left while blocking any flow in the opposite direction. Each of the check valves 66 is held within the block 12 by a retainer 74. Each retainer 74 is held within the block 12 by a common hold down bar 76 secured to the valve block 12 by a pair of screws 78. To reverse the orientation of the check valves 66, the retainer 74 is removed from the valve block 12. The check valve is then taken out of its retaining bore 79 and replaced within the bore 79 in the opposite direction.

Access to the check valves 66 is thereby greatly simplified. By merely removing screws 78, a retainer 74 can be slipped out of the valve block 12 and the check valve 66 is secured by the retainer 74 can be removed.

In order to control the speed of air passing through the outlet conduits 44, flow control valves such as needle valves 80, 81 are disposed within the flow path of the outlet conduits 44, 45. The valves 80, 81 are located at the junction of the branch conduits 50 and 52 with the respective primary conduits 48, 51. The valves 80, 81 are secured within the block 12 by nuts 82, 83 and valve holders 84, 85.

The flow control valves 80, 81 operate in conjunction with the check valves 66 to control the speed of the air flowing through the outlet conduits 44, 45. The valves 80, 81 will effectively control the flow of air only in one direction. The direction in which the valves 80, 81 provide flow control is dependent upon the orientation of the check valves 66 within their respective branch conduits 49, 54. When a check valve 66 is orientated to allow free flow from a primary conduit 48, 51 to an outlet 56, 58, the valves 80, 81 will not effectively control the speed of the air flowing in such a direction. However, with a check valve 66 in this orientation, the valves 80, 81 will effectively control the flow of air exhausting from outlets 56, 58 to their respective exhaust manifolds 26, 28.

When the orientation of check valve 66 is reversed to allow the free flow of air from outlets 56, 58 to their respective primary conduits 48, 51, the direction in which the valves 80, 81 provide effective flow control is likewise reversed. That is, with the orientation of check valves 66 so reversed, the valves 80, 81 would control the speed of the air flowing from primary conduits 48, 51 to their respective outlets 56, 58. The flow control valves 80, 81 provide effective control of the air flow only in the direction in which the check valves 66 completely stop the flow through branch conduits 49, 54.

Figure 3:
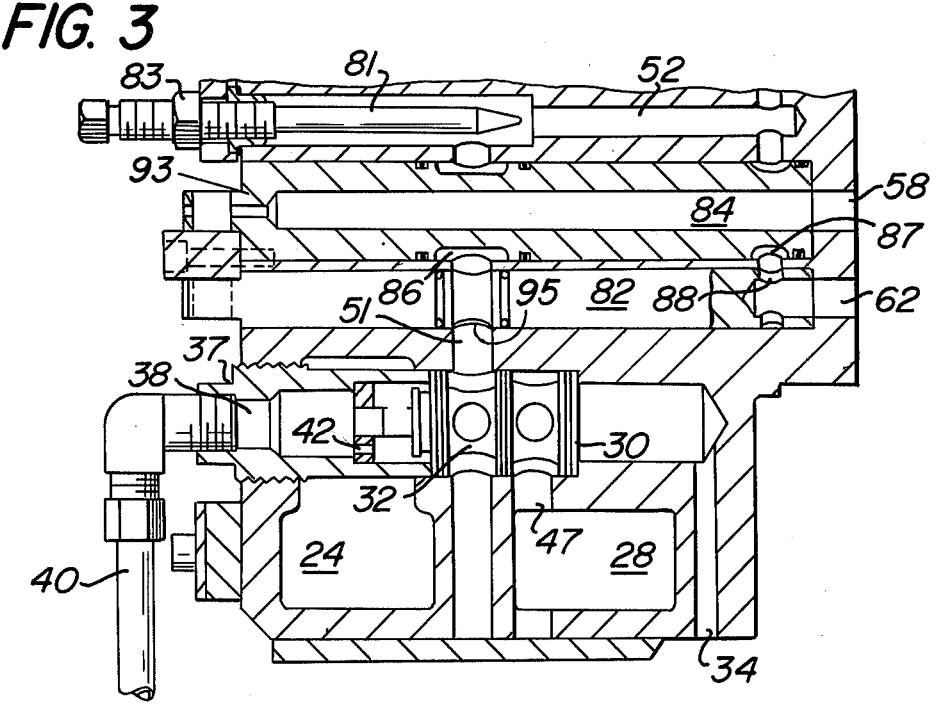
FIG. 3 is a sectional view similar to FIG. 2 showing an alternate valve station arrangement for blow and blow operation.

FIG. 3 illustrates a valve station 17 arranged to supply counter blow air during a blow and blow operation. An insert plug 82 is substituted for the plug 60 which is used in the press and blow operation. The insert plug 82 is designed to allow communication to outlet 62. A venting insert 93 is substituted for the check valve 66 and its retainer 74. The venting insert 93 vents the outlet 58 to atmosphere through conduit 84. In this arrangement, air will flow within the primary conduit 51 by recess 95 within the plug 82 and by recess 86 within the insert 93. The air will thereafter flow past valve 81, through branch conduit 52 and finally be recess 87 of insert 83 and through aperture 88 of plug 82 to the outlet 62.

In operation, when a function of the forming machine actuated by a certain valve station is to be performed, the electronic timing means will actuate the respective solenoid to thereby allow air to flow through pilot inlets 33 or 34. The valve member 31 or 32 will thereby move from its closed position to its open position. Pressurized air will then flow from either manifold 22 or 24 or from an isolated air source to a primary conduit 48 or 51. Thereafter, dependent upon the specific valve station arrangement, the air will flow through one or two of the branch conduits to the desired outlet. The desired function within the glass-forming machine is thereby actuated. The timing mechanism continues to actuate the valve stations 16, 17 in a properly ordered sequence to thereby automatically operate the IS glass-forming machine.

The present invention may be embodied in other specific forms without departing from the spirit or essential attributes thereof and, accordingly, reference should be made to the appended claims, rather than to the foregoing specification as indicating the scope of the invention.

I claim:

1. A valve block assembly for use in glassware forming machines comprising:
    a valve block having at least two rows of valve stations arranged parallel to one another;
    a separate air supply manifold communicating with each of said rows of valve stations for supplying pressurized air to said valve stations;
    a separate air exhaust manifold communicating with each of said rows of valve stations for exhausting air from said valve stations;
    a cartridge valve disposed at each of said valve stations for controlling the flow of air through a respective valve station;
    an outlet conduit forming a flow path away from each of said cartridge valves;
    a flow control valve disposed within said outlet conduits;
    a check valve disposed within at least one of said outlet conduits, all said flow control and check valves being between elevations of said manifolds; and means for retaining each said check valves within its respective outlet conduit, said retaining means being removable from a front face of said valve block.

2. An apparatus in accordance with claim 1 wherein said outlet conduit comprises a primary conduit leading from said cartridge valve and at last one branch conduit, said flow control valve being disposed between said primary conduit and said at least one branch conduit.

3. An apparatus in accordance with claim 1 wherein said outlet conduit comprises a primary conduit leading from said cartridge valve and at least two branch conduits, said flow control valve being disposed between said primary conduit and one of said branch conduits and said check valve being disposed within another of said branch conduits.

4. An apparatus in accordance with claim 3 wherein said primary conduit and said branch conduit containing said check valve have substantially equal inner diameters of at least one-half inch and said check valve has an effective flow passage substantially equal to the inner diameter of said primary conduit and branch conduit containing said check valve.

5. An apparatus in accordance with claim 1 wherein said check valve has a flow passage with an effective diameter substantially equal to the diameter of said primary conduit and said branch conduit containing said check valve.

6. An apparatus in accordance with claim 1 wherein said retaining means comprises a separate discrete body for holding each of said check valves.

7. An apparatus in accordance with claim 6 wherein the retaining means of said check valves are arranged in at least two rows parallel to one another, and a removable hold down bar secures each of said rows of retaining means within said valve block.

8. An apparatus in accordance with claim 1 wherein said check valve is reversible within said outlet conduit.

9. An apparatus in accordance with claim 1 including a separate means for securing each of said cartridge valves within said valve block, each of said securing means extending from the front face of said valve block and being removable therefrom, said cartridge valve being removable from said valve block after the removal of said securing means without dismantling the valve block.

10. An apparatus in accordance with claim 1 wherein the air supply from said supply manifold is blocked in at least one valve station and a separate source of pressurized air is supplied for said last-mentioned station.

11. A valve block assembly for use in glassware forming machines comprising:
a valve block having at least two rows of valve stations arranged parallel to one another;
an air supply manifold communicating with each of said rows of valve stations for supplying pressurized air to said valve stations;
an air exhaust manifold communicating with each of said rows of valve stations for exhausting air from said valve stations;
a cartridge valve mounted in a front face of said block and disposed at each of said valve stations for controlling the flow of air through a respective valve station;
an outlet conduit forming a flow path away from each of said cartridge valves;
a flow control valve mounted in a front face of said block and disposed within said outlet conduits;
a check valve mounted in a front face of said block and disposed within at least one of said outlet conduits, all of said valves being removable from a vertical front face of said valve block without dismantling the block.

12. An apparatus in accordance with claim 11 wherein a first air supply manifold and a first air exhaust manifold are located at a first elevation and communicate with a first row of valve stations and a second air supply manifold and a second air exhaust manifold are located at a second elevation and communicate with a second row of valve stations.

13. An apparatus in accordance with claim 12 wherein all of said flow control and check valves are between said first and second elevations.

14. A valve block assembly for use in glassware forming machines comprising:
a valve block having a front face and at least two valve stations;
means for supplying pressurized air to said valve stations;
means for exhausting air from said valve stations;
a valve means for controlling the flow of air through each valve station;
an outlet conduit forming a flow path away from each of said valve means;
said outlet conduits each having a primary conduit leading from said valve means and a branch conduit communicating between said primary conduit and an outlet from said valve block;
a check valve disposed within at least one of said branch conduits, said primary conduit, said branch conduit and said check valve forming a flow passage having a substantially uniform effective diameter;
said check valve being removable from said valve block; and
means for retaining said check valve in said branch conduit, said retaining means being removable from said front face of said valve block.

15. An apparatus in accordance with claim 14 wherein said effective diameter is at least one-half inch.

16. An apparatus in accordance with claim 14 including a plurality of valve stations arranged in at least two rows parallel to one another.

17. An apparatus in accordance with claim 16 including a second branch conduit communicating between at least one of said primary conduits and an outlet from said valve block, and a flow control valve disposed between said primary conduit and said second branch conduit.

18. An apparatus in accordance with claim 14 wherein said check valve is reversible within said branch conduit.

* * * * *